United States Patent Office 3,086,972
Patented Apr. 23, 1963

3,086,972
AZA-THIAXANTHENE DERIVATIVES
Ernst Jucker, Binningen, Basel-Land, and Anton Ebnöther, Basel, Switzerland, assignors to Sandoz A.G., Basel, Switzerland, a Swiss firm
No Drawing. Filed Mar. 17, 1961, Ser. No. 96,401
Claims priority, application Switzerland Mar. 24, 1960
8 Claims. (Cl. 260—240)

The present invention relates to new 1-aza-thiaxanthene derivatives, their physiologically acceptable addition salts with acids and a process for their manufacture.

The new 1-aza-thiaxanthene derivatives of the present invention correspond to the general Formula I

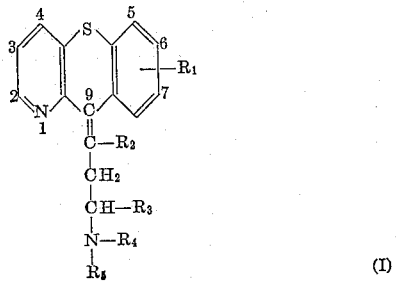

wherein $R_1$ represents a member selected from the group consisting of hydrogen and halogen, each of $R_2$ and $R_3$ stands for hydrogen, and each of $R_4$ and $R_5$ stands for a lower alkyl group (e.g., methyl, ethyl, propyl, butyl, etc.), and $R_5$ together with $R_2$, $R_3$ and $R_4$ represents an alkylene group containing at most four carbon atoms in straight chain, with the proviso that when a heterocyclic radical is attached to carbon atom 9 of the aza-thiaxanthene nucleus, it must contain 5 to 6 ring members.

The aforesaid 1-aza-thiaxanthene derivatives of the general Formula I are prepared according to this invention by reacting a 1-aza-thiaxanthone derivative of the general Formula II

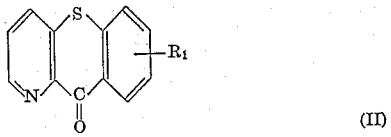

wherein $R_1$ has the above significance as in Formula I, with an organic metal compound of the general Formula III $$R_5-N-CH-CH_2-CH-Me-Hal$$
$$\quad\quad\ \ |\quad\ |\quad\quad\quad\ |$$
$$\quad\quad R_2\ R_3\quad\quad\ R_4 \quad\quad\quad\quad\quad\quad (III)$$

wherein $R_2$, $R_3$, $R_4$ and $R_5$ have the above significance, Me represents magnesium or a magnesium alloy (e.g., a copper magnesium alloy), and Hal is halogen selected from the group consisting of chlorine, bromine and iodine, and the reaction product is then hydrolyzed to give a 1-aza-thiaxanthydrol derivative of the general Formula IV

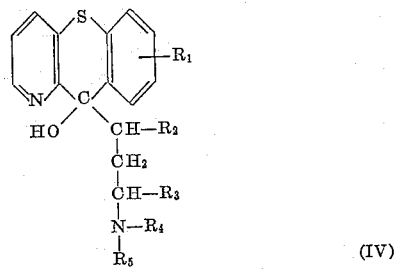

wherein $R_1$, $R_2$, $R_3$, $R_4$ and $R_5$ have the above significance.
The intermediate compound of Formula IV is treated with a dehydrating agent, and, when it is desired to produce a physiologically acceptable acid addition salt, reaction with a physiologically acceptable organic or inorganic acid is effected by treating the base with the selected acid.

The products of the process of the invention are obtained in the form of stereoisomers and it is within the scope of the present invention to effect separation of said stereoisomers by methods which in themselves are known.
One method of carrying out the process of the invention is effected for example, as follows:

A metal halogen alkyl compound of the Grignard type in accordance with Formula III is made by reacting a basic substituted alkyl halide by the Grignard method with a copper-magnesium alloy known as Gilman alloy, in the presence of liquid anhydrous open-chain or cyclic ether, e.g., diethyl ether or tetrahydrofuran cover the alloy in finely divided form which is used in excess. The basic substituted halogen alkyl derivative may be (1) a dialkyl-aminoalkylhalide, such as, for example, dimethylamino-propylchloride, diethylaminopropylbromide or dimethyl-aminopropyliodide, or (2) a N-alkyl-piperidyl-(2)-ethyl halide, such as, for example, N-methyl-piperidyl-(2)-ethylchloride, N-methyl-piperidyl-(2)-ethylbromide or N-isopropyl-piperidyl-(2)-ethylchloride, or it may be (3) a N-alkyl-pyrrolidyl-(2)-ethylhalide, such as, for example, N-methyl-pyrrolidyl-(2)-ethylchloride or N-methyl-pyrrolidyl-(2)-ethylbromide, or it may be (4) an N-($\gamma$-halogenpropyl)-pyrrolidin, for example, N-($\gamma$-chloro-propyl)-pyrrolidin, or an N-alkyl-4-halogen-piperidine, for example, N-methyl-4-chlor-piperidin or N-isopropyl-4-brompiperidin.

In order to accelerate the preparation of the Grignard compound, there may be added an activator for the metal reactant such as a few drops of methyl iodide, or ethyl bromide, or ethylene bromide, or a trace of iodine, this activator being added to the ethereal suspension of copper-magnesium alloy and the basic (amino) substituted alkyl halide before bringing the reaction mixture to its reflux temperature at atmospheric pressure.

In place of the Gilman alloy of copper-magnesium there may be used magnesium turnings which are activated by pre-etching with iodine vapors and the reaction being carried out in the same anhydrous open-chain or cyclic anhydrous liquid ether medium to prepare the Grignard reagent in ether solution.

A compound of the general Formula II above is then added to the said Grignard reagent solution and the resulting mixture is heated so as to complete the reaction. The reaction product resulting in this manner is then hydrolyzed in the cold with an aqueous ammonium chloride solution and extraction is effected by means of an inert organic solvent which is immiscible with water, preferably chloroform or diethyl ether.

In order to isolate the resulting compound of Formula IV above, distillation or crystallization may be effected and conversion into acid addition salts may likewise be effected; however, further working up may be effected without purification.

Dehydration is effected by heating the compound of Formula IV, dissolved, for example, in glacial acetic acid with a dehydrating agent (for example, concentrated hydrochloric acid, concentrated sulfuric acid, phosphorus oxychloride, thionyl chloride or zinc chloride). The end product may be isolated and purified using a known methods; as already indicated above, separation into the individual stereoisomers may be effected and/or conversion into an acid addition salt, for example, by reaction with hydrochloric, hydrobromic, sulfuric, citric, oxalic, tartaric, succinic, maleic, acetic, benzoic, hexahydrobenzoic, methanesulfonic or fumaric acid.

UTILITY

The compounds of Formula I above are oily or crystalline substances at room temperature and they are basic compounds which have useful pharmacodynamic properties either in the form of the free base or acid addition salts with physiologically acceptable acids. The compounds of Formula I serve also as intermediate compounds for the production of pharmaceuticals.

The acid addition salts of the novel compounds of Formula I are stable crystalline salts and are prepared by reacting the basic compounds of Formula I with pharmacologically acceptable inorganic or organic acids such as hydrochloric acid, hydrobromic acid, hydroiodic acid, sulfuric acid, phosphoric acid, nitric acid, benzoic acid, benzene sulfonic acid, naphthalene sulfonic acid, naphthalene 1,5-disulfonic acid, salicylic acid, glycolic acid, acetic acid, succinic acid, mandelic acid, nicotinic acid, tartaric acid, levulinic acid, stearic acid, myristic acid, palmitic acid, citric acid, isocitric acid, maleic acid, glutaric acid, malic acid, pimelic acid, lactic acid and the like.

In the form of the base or salt, the compounds of Formula I may be administered by the oral route or by the parenteral route, e.g., intra-muscular injection and the compounds appear to be readily absorbed after oral ingestion or from intra-muscular injection sites.

The compounds under Formula I, particularly those which have been illustrated in the examples hereinafter, exhibit a surprisingly large number of actions. Remarkably, the compounds of Formula I or their non-toxic physiologically acceptable acid addition salts show potent antihistaminic and adrenolytic properties, narcosis potentiation, inhibition of conditioned reactions, antipyretic activity and sedative effects. Due to its relatively low toxicity in effective dosage, the compounds under Formula I are valuable therapeutical substances for allergic diseases due to their antihistaminic effects. Because of their sedative and tranquillizing activity, the compounds can be used for the therapy of psychic disorders (excitement, anxiety, psychoses etc.).

Those of the starting materials of Formula II above, wherein $R_1$ represents a halogen atom, are new and may be produced as follows:

3-aminopyridine-2-carboxylic acid (M.P. 210° C., decomposition) is converted into its hydrochloride and diazotized with sodium nitrite in the cold and the resulting diazonium salt solution is reacted at an elevated temperature with a halogenothiophenol in the presence of an alkali metal hydroxide. From the resulting alkali metal salt of 2-carboxypyridyl-(3)-halogeno-phenyl sulfide the free acid is regenerated and the corresponding acid halide is then cyclized in the presence of a cyclization agent, e.g., aluminum chloride. Any positional isomers resulting in this reaction may be separated by fractional crystallization.

In the following examples, which illustrate the invention but in no way limit it, all temperatures are stated in degrees centigrade and are corrected.

EXAMPLE 1

*9-(3'-Dimethylamino-Propylidene)-1-Aza-Thiaxanthene*

(a) *9-(3'-dimethylamino-propyl)-1-aza-thiaxanthydrol.*—5 cc. of a solution of 27 g. of dimethylaminopropyl chloride in 60 cc. of absolute ether, a few drops of methyl iodide and an iodine crystal are added to a mixture, covered with a layer of 30 cc. of absolute ether, of 3 g. of activated copper-magnesium alloy (Gilman) and 3 g. of a non-activated copper-magnesium alloy. When the reaction begins, the remaining 55 cc. of dimethylamino propyl chloride solution are added dropwise, and the reaction mixture is then maintained for 4 hours under reflux at the boil. When the mixture has cooled to room temperature, 10 g. of finely pulverized 1-aza-thiaxanthone (M.P. 224°) are added portionwise and the mixture is then refluxed for one hour. The cooled solution is then poured into an ice cold solution of 45 g. of ammonium chloride in 600 cc. of water and then shaken out with chloroform. The chloroform extract is washed with a 10% solution of potassium carbonate and extracted with 50 cc. of a 1 N-hydrochloric acid 5 times. The combined hydrochloric extracts are alkalized and extracted with chloroform. After drying of the chloroform extract over magnesium sulfate and removal of the solvent by evaporation, the residue is distilled, the 9-(3'-dimethylamino-propyl)-1-aza-thiaxanthydrol coming over at an air bath temperature of 150 to 200° under a pressure of 0.01 mm. Hg in the form of a yellow oil.

The oil recovered in the preceding part of this example is dissolved in 25 cc. of ethanol and the calculated quantity of fumaric acid is added to the solution, the acid fumarate crystallizing after a while. After recrystallization from ethanol, the melting point of the acid fumarate compound under decomposition is 133 to 136°.

(b) *9-(3'-dimethylamino-propylidene)-1-aza-thiaxanthene.*—A solution of 15 g. of 9-(3'-dimethylamino-propyl)-1-aza-thiaxanthydrol fumarate in 150 cc. of glacial acetic acid and 60 cc. of concentrated hydrochloric acid is refluxed for 1 hour, and then evaporated in a vacuum until dry. The residue is then shaken out with a dilute solution of aqueous ammonium hydroxide and the chloroform extract is dried over potassium carbonate, the solvent being evaporated. The calculated quantity of fumaric acid is added to a solution of the residue in 30 cc. of ethanol and the whole is briefly heated. As the mixture cools, the acid fumarate of the 9-(3'-dimethylamino-propylidene)-1-aza-thiaxanthene crystallizes. This is then twice recrystallized from ethanol to recover the purified compound, M.P. 148–149° (decomposition).

EXAMPLE 2

*9-(3'-Dimethylamino-Propylidene)-6-Chloro-1-Aza-Thiaxanthene*

As described in Example 1, the Grignard compound of dimethylamino-propyl chloride is prepared. When the mixture has cooled to room temperature, 10 g. of finely pulverized 6-chloro-1-aza-thiaxanthone, M.P. 247–250°, (decomposition) are added portion-wise and the whole is boiled under reflux for one hour. The cooled reaction mixture is then stirred into an ice cold solution of 45 g. of ammonium chloride in 600 cc. of water. After chloroform has been added, the mixture is filtered, the chloroform layer is separated off and the aqueous phase again shaken out with chloroform. The combined chloroform extracts are washed with a 10% solution of potassium carbonate and then shaken out with 50 cc. of a 1 N-hydrochloric acid 5 times. The hydrochloric acid extract is then cooled and alkalized, and again extracted with chloroform. The residue remaining after drying over potassium carbonate and evaporation of the solvent is dissolved in 120 cc. of glacial acetic acid and 50 cc. of concentrated hydrochloric acid and heated for 1 hour to 100°. The solution is then evaporated in a vacuum, a dilute aqueous solution of ammonium hydroxide is added to the residue, and this is then extracted with chloroform three times. When the combined chloroform extracts have been dried over potassium carbonate the solvent is driven off in a vacuum and the remaining dark brown oil is chromatographed on 250 g. of alumina (Merck). The brown oil eluted with chloroform and with a chloroform containing 0.5% of ethanol is dissolved in 30 cc. of ethanol. 3.55 g. of fumaric acid are added to this solution which is briefly heated, ether being added very slowly while the mixture of the two acid fumarate cis-trans isomers gradually crystallizes.

When the isomer mixture is recrystallized from a 95% ethanol, the acid fumarate of the A isomer crystallizes first with 1 mol of water of crystallization, forming needle-like prisms. If much ether has been added, the acid fumarate of the B isomer likewise crystallizes from the mother liquor.

The acid fumarate of the A isomer, after repeated recrystallization from a 95% ethanol, melts at 130–140°, yielding its water of crystallization.

The acid fumarate of the B isomer, after repeated recrystallization from isopropanol, melts at 147–148°.

The preparation of the 6-chloro-1-aza-thiaxanthone initially used will be described at the end of Example 3.

EXAMPLE 3

9-(3'-Dimethylamino-Propylidene)-8-Chloro-1-Aza-Thiaxanthene

In a manner analogous to that described in Example 2 the 9-(3'-dimethylamino-propylidene)-8-chloro-1-aza-thiaxanthene is obtained from 8-chloro-1-aza-thiaxanthone (M.P. 214–216°) and dimethylamino-propyl chloride. For preparing the neutral fumarate the oil eluted from the chromatogram with chloroform and a chloroform containing 0.5% ethanol is dissolved in 20 cc. of isopropanol, 1.7 g. of fumaric acid being added to the solution which is then briefly heated, causing the neutral fumarate of the 9-(3'-dimethylamino-propylidene)-8-chloro-1-aza-thiaxanthene to crystallize slowly. After two recrystallizations from isopropanol the salt melts at 158–160° (decomposition).

The initial substances used in Examples 2 and 3, viz. the 6-chloro- and the 8-chloro-1-aza-thiaxanthone are prepared as follows:

(a) *2-carboxypyridyl-(3) - m - chlorophenyl sulfide.—* 18.9 g. of 3-amino-pyridine-2-carboxylic acid (M.P. 210°, decomposition) are dissolved, by heating to about 60°, in 30 cc. of concentrated hydrochloric acid. The solution is cooled to 5°, causing the hydrochloride to precipitate, a solution of 10.5 g. of sodium nitrite in 75 cc. of water being then added dropwise while the solution is being well stirred. Any slight excess of nitrous acid is later destroyed by an addition of urea.

The resultant diazonium salt solution is well stirred whilst being added dropwise in the course of half an hour to a solution, maintained at a temperature of 95°, of 30 g. of sodium hydroxide and 21 g. of m-chloro-thiophenol in 150 cc. of water. Stirring is continued for about 10 minutes, before filtering and cooling, causing the sodium salt of the 2-carboxy-pyridyl-(3)-m-chlorophenyl sulfide to crystallize. After filtration the crystallized mass is thoroughly washed with ether to remove the m-dichloro-diphenyl disulfide which has formed as a by-product. Recrystallization is then effected from glacial acetic acid, and the free acid is thus obtained. M.P. 168–169° (decomposition).

(b) *6-chloro- and 8-chloro-1-aza-thiaxanthone.—*45 g. of 2-carboxy-pyridyl-(3)-m-chlorophenyl sulfide and 200 cc. of thionyl chloride are refluxed for 1½ hours. After removal of excess thionyl chloride in a vacuum the remaining acid chloride is dissolved in 450 cc. of carbon disulfide, and 115 g. of anhydrous aluminum chloride are then added to the solution while cooling. The mixture is then again refluxed for 4 hours, a dark resin depositing on the floor of the flask. After cooling, the solvent is decanted and the resin triturated in ice water. With a 50% solution of potassium hydroxide the reaction mixture is strongly alkalized, stirred with chloroform and filtered through highly purified fuller's earth. The filtration residue is boiled out twice with chloroform and the filtrate obtained by filtration through the fuller's earth is shaken out with chloroform. The combined chloroform extracts are dried over magnesium sulfate and the solvent is driven off. The resultant solid residue is recrystallized from glacial acetic acid, the 6-chloro-1-aza-thiaxanthone (initial substance in Example 2) crystallizing in the form of needles. The substance is twice recrystallized from glacial acetic acid. M.P. 247–250° (decomposition).

For preparing the 8-chloro-1-aza-thiaxanthone (initial substance in Example 3) the glacial acetic acid mother liquor is boiled down in a vacuum, and the residue is repeatedly recrystallized from chloroform. M.P. 214–216°.

EXAMPLE 4

9-{2'-[N-Methyl-Piperidyl-(2)]-Ethylidene}-1-Aza-Thiaxanthene (a) *9 - {2'-[N-methyl-piperidyl-(2")]-ethyl}-1-aza-thiaxanthydrol.—*3 g. of activated copper-magnesium alloy (Gilman) are covered with a layer of 15 cc. of ether, and 0.4 cc. of ethylene bromide are then added thereto. As soon as the reaction begins, a solution of 18 g. of N-methyl-piperidyl-(2)-ethyl chloride in 30 cc. of ether is added dropwise in the course of 10 minutes, and the mixture is boiled for four hours under reflux. 50 cc. of tetrahydrofuran are then added, causing the Grignard compound to dissolve. The mixture is then cooled to 30°, and 5 g. of finely pulverized 1-aza-thiaxanthone (M.P. 224°) are added portionwise to the solution. This is followed by one hour's boiling under reflux. The cooled reaction solution is stirred into 300 cc. of a 10% ice cold solution of ammonium chloride. The organic layer is separated off and the aqueous phase repeatedly extracted with chloroform. The chloroform extracts are combined with the organic layer, dried over potassium carbonate and then boiled down until dry. The residue is distilled in a bulb tube, and at a pressure of 0.01 mm. Hg, the 9-{2' - [N-methyl-piperidyl-(2")]-ethyl}-1-aza-thiaxanthydrol comes over in the form of a yellow viscous oil at 175 to 200°.

(b) *9-{2'-[N-methyl-piperidyl-(2")]-ethylidene}-1-aza-thiaxanthene.—*The oil thus obtained is dissolved in a mixture of 60 cc. of glacial acetic acid and 25 cc. of concentrated hydrochloric acid, and the solution is refluxed for one hour. It is then boiled down under vacuum until dry and the residue is dissolved in water, the solution being alkalized with sodium hydroxide and the separated substance taken up in chloroform. After having dried the chloroform solution over potassium carbonate and driven off the solvent, the residue is dissolved in hexane and treated with animal charcoal for the removal of resins. When this solution is concentrated the A isomer of 9-{2'-[N - methyl - piperidyl-(2")]-ethylidene}-1-aza-thiaxanthene crystallizes. After recrystallization from acetone it melts at 122–124° and sinters above 119°.

The neutral naphthalene-1,5-disulfonate prepared therefrom crystallizes in the form of needles from methanol. These become yellow above 190° and between 202 and 205° they melt and decompose. The salt is insoluble in water.

The B isomer of 9-{2'-[N-methyl-piperidyl-(2")]-ethylidene}-1-aza-thiaxanthene is isolated in the following way:

The non-crystallizing hexane mother liquors are boiled down until dry. The residual oil is dissolved in methanol and the solution is adjusted to pH 6.0 with aqueous hydrobromic acid. This solution is evaporated in a vacuum and the residue is dissolved in acetone from which the hydrobromide of the B isomer crystallizes. After recrystallization from ethanol this melts at 170–171° under decomposition. The crystals are yellowish brown prisms.

EXAMPLE 5

9-(3'-Pyrrolidino-Propylidene)-1-Aza-Thiaxanthene (a) *9 - (3'-pyrrolidino-propyl)-1-aza-thiaxanthydrol.—*3.5 g. of activated copper-magnesium alloy (Gilman) are covered with a layer of 15 cc. of ether, and 0.5 cc. of ethylene bromide are then added. As soon as the reaction begins a solution of 19 g. of N-(γ-chloropropyl)-pyrrolidine in 40 cc. of ethyl is introduced dropwise, and the reaction mixture is boiled under reflux for 4 hours. 50 cc. of tetrahydrofuran are then added, causing the Grignard compound to be dissolved. The solution is now cooled to 30° and 8 g. of finely pulverized 1-aza-thiaxanthone (M.P. 224°) are added portionwise, the solution being heated to the boil under reflux for 1 hour. The cooled reaction mixture is stirred into an ice cold solution of 300 cc. of a 10% solution of ammonium chloride. The organic layer is separated off and the aqueous solution extracted three times with chloroform. The chloroform extracts are recombined with the organic layer and after having been dried over potassium carbonate, they are evaporated until dry. The residue is distilled in a bulb tube and, at a pressure of 0.01 mm. Hg the 9-(3'-pyrrolidino-propyl)-1-aza-thiaxanthydrol comes over in the form of a red oil at 175 to 200°. For the preparation of the naphthalene-1,5-disulfonate the oil is dissolved in methanol and the calculated quantity of naphthalene-1,5-disulfonic acid is added. After recrystallization from methanol the salt melts at 202-204°, decomposing (gradually yellowing above 190°).

(b) *9 - (3' - pyrrolidino-propylidene) - 1 - aza-thiaxanthene.*—10.9 g. of the naphthalene-1,5-disulfonate thus obtained are dissolved in a mixture of 100 cc. of glacial acetic acid and 40 cc. of concentrated hydrochloric acid and boiled for 1 hour under reflux. The solution is then evaporated to dryness under vacuum, and the residue is dissolved in water. This solution is alkalized with sodium hydroxide and the separated substance is taken up in chloroform. After drying the chloroform solution over potassium carbonate and driving off the solvent, the residue is dissolved in hexane and treated with animal charcoal for the removal of resins. After evaporation of the solvent the remaining oil is dissolved in methanol and the solution is adjusted to pH 5.8 with aqueous hydrobromic acid. The solution is then evaporated in a vacuum until dry and the residue is dissolved in acetone, from which the 9-(3'-pyrrolidino-propylidene)-1-aza-thiaxanthene hydrobromide crystallizes. The salt is twice recrystallized from ethanol. M.P. 175-176° (decomposition); sintering above 173°.

The neutral naphthalene-1,5-disulfonate browns above 210° and melts at 230-231° under decomposition. It is insoluble in water.

EXAMPLE 6

*9-[N-Methyl-Piperidylidene-(4')]-1-Aza-Thiaxanthene*

(a) *9-[N - methyl - piperidyl - (4')] - 1 - aza - thiaxanthydrol.*—3 g. of activated copper-magnesium alloy (Gilman) are covered with a layer of 10 cc. of tetrahydrofuran, and 0.4 cc. of ethylene bromide are added. As soon as the reaction begins a solution of 16.3 g. of N-methyl-4-chloropiperidine in 20 cc. of tetrahydrofuran is added dropwise in the course of 20 minutes, causing the temperature of the solution to rise to boiling point. The solution is refluxed for 1½ hours, then cooled to about 50°, and 6 g. of finely pulverized 1-aza-thiaxanthone (M.P. 224°) are added to the solution in portions. The red solution is again boiled under reflux for 30 minutes and, after having cooled, it is poured into a 10% solution of ammonium chloride. The metal residues are filtered off, the filtrate is shaken out three times with chloroform, the combined chloroform extracts are dried over potassium carbonate and the solution is boiled down to dryness. The residue is triturated in hot hexane and resins are removed by decanting the solution. When the considerably concentrated solution is seeded, the 9-[N-methyl-piperidyl-(4')]-1-aza-thiaxanthydrol crystallizes. After recrystallization from acetone it melts at 157-158°.

(b) *9 - [N-methyl - piperidylidene-(4')]-1-aza-thiaxanthene.*—2 g. of the 9-[N-methyl-piperidyl-(4')]-1-aza-thiaxanthydrol thus obtained are heated for 30 minutes to 140° in 15 cc. of an 85% sulfuric acid. The reaction product is poured on to ice, alkalized with potassium hydroxide and extracted with chloroform. When the chloroform extract has been dried over potassium carbonate and the solvent has been driven off the residue is crystallized from ether or acetone. 9-[N-methyl-piperidylidene-(4')]-1-aza-thiaxanthene melts at 154-156°, sintering above 152°.

EXAMPLE 7

*9-{2'-[N-Methyl-Pyrrolidyl-(2)]-Ethylidene}-1-Aza-Thiaxanthene*

3.6 g. of activated copper-magnesium alloy (Gilman) are covered with a layer of 30 cc. of tetrahydrofuran, and 0.5 cc. of ethylene bromide are added. As soon as the reaction has begun with some vigor a solution of 20 g. of N-methyl-pyrrolidyl-(2)-ethyl chloride in 30 cc. of ether is added dropwise, and the mixture is refluxed for 2 hours. At a temperature of 30° a total of 8 g. of finely pulverized 1-aza-thiaxanthone (M.P. 224°) is added portion-wise to the mixture which is then again boiled under reflux for 1 hour. The cooled reaction mixture is now poured into 360 cc. of an ice cold 10% solution of ammonium chloride. Metal residues are filtered off and the filtrate is shaken out with ether three times. After drying of the combined ethereal solutions and evaporation of the solvent the residue is distilled in a highly evacuated bulb tube. The yellow viscous oil which distills over at a pressure of 0.01 mm. Hg between 180° and 205° is dissolved in a mixture of 100 cc. of glacial acetic acid and 40 cc. of concentrated hydrochloric acid. The solution is boiled under reflux for 1 hour and then evaporated to dryness under vacuum. The solution of the residue in water is alkalized and repeatedly extracted with chloroform. After having been dried over potassium carbonate the chloroform extract is evaporated until dry and the remaining brown oil is dissolved in benzene. For the removal of resins the benzene solution is chromatographed on a column of 300 g. of alumina, and the mixture of the two isomers of 9-{2'-[N-methyl-pyrrolidyl-(2)]-ethylidene}-1-aza-thiaxanthene in the form of a light brown oil is eluted with benzene.

The isomers are then isolated as follows:

A solution of 3.45 g. of naphthalene-1,5-disulfonic acid in 15 cc. of methanol is added to a solution of 7.3 g. of the crude isomer mixture in 10 cc. of methanol. When cooled the neutral naphthalene-1,5-disulfonate of the A isomer crystallizes and is recrystallized from a mixture of methanol and water (9:1). M.P. 208-210°.

The acid oxalate of the A isomer, crystallized from ethanol, melts at about 145° (decomposition) after turning brown above 130°.

The non-crystallizing portions in the form of the naphthalene-1,5-disulfonate are converted into the base by shaking them out with chloroform and sodium hydroxide. The chloroform layer is separated and the solvent evaporated. The residue is dissolved in ether and the ethereal solution treated with animal charcoal for the removal of resins. After the solvent has been driven off the residue is dissolved in ethanol, the solution is adjusted to pH 5.6 with an aqueous hydrobromic acid and then boiled down under vacuum until dry. The residue is boiled up in acetone, and the B isomer of 9-{2'-[N-methyl-pyrrolidyl-(2)]-ethylidene}-1 - aza - thiaxanthene then crystallizes in the form of its hydrobromide. The prisms which crystallize from ethanol gradually discolor above 180° and melt at 190-192° under decomposition.

In the foregoing examples it is illustrated that the 1-aza-thiaxanthene nucleus can be substituted by halogen (chlorine) in the position 6 and 8. $R_1$ may also be a halogen atom other than chlorine, for example bromine and iodine in either the 5, 6, 7 and 8 positions of the 1-aza-thiaxanthene nucleus in accordance with the general method of procedure outlined hereinbefore and the method of the specific example, example 3, illustrating 6-chloro and 8-chloro derivatives.

$R_4$ and $R_5$ are methyl, but each of $R_4$ and $R_5$ may also be ethyl, propyl, isopropyl, butyl and isobutyl.

$R_5$ together with $R_2$, $R_3$ and $R_4$ is an alkylene group containing at most four carbon atoms in straight chain, forming with the nitrogen atom a 5 or 6 membered heterocyclic radical, e.g., pyrrolidino, 2-pyrrolidyl, 2-piperidyl or 4-piperidylidene. These heterocyclic rings may be substituted by a lower alkyl group.

Having thus disclosed the invention, what is claimed is:

1. A member of the class consisting of 1-aza-thiaxanthenes of the formula

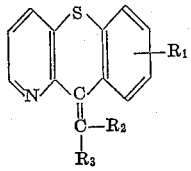

wherein $R_1$ is a member selected from the group consisting of hydrogen and halogen, $R_2$ taken individually is hydrogen, $R_3$ taken individually is a member selected from the group consisting of lower dialkylamino ethyl, pyrrolidino ethyl, N-lower alkyl-2-pyrrolidyl methyl, N-lower alkyl-2-piperidyl methyl and $R_2$ and $R_3$ taken collectively with the carbon atom to which they are joined, represents N-lower alkyl-piperidylidene-(4) and non-toxic therapeutically useful salts thereof with an acid selected from the group consisting of hydrochloric acid, hydrobromic acid, hydriodic acid, sulfuric acid, phosphoric acid, fumaric acid, maleic acid, naphthalene-1,5-disulfonic acid, salicylic acid, glycolic acid, tartaric acid, citric acid, glutaric acid, malic acid and lactic acid.

2. 9-(3'-dimethylamino-propylidene)-1-aza-thiaxanthene.

3. 9-(3'-dimethylamino-propylidene)-6-chloro-1-aza-thiaxanthene.

4. 9-(3'-dimethylamino-propylidene)-8-chloro-1-aza-thiaxanthene.

5. 9-(3'-pyrrolidino-propylidene)-1-aza-thiaxanthene.

6. 9-{2'-[N-methyl-piperidyl-(2)]-ethylidene}-1-aza-thiaxanthene.

7. 9-{2'-[N-methyl-pyrrolidyl-(2)]-ethylidene}-1-aza-thiaxanthene.

8. 9-[N-methyl-piperidylidene-(4')]-1-aza-thiaxanthene.

References Cited in the file of this patent

UNITED STATES PATENTS 2,913,458    Druey et al. _____ Nov. 17, 1959
2,996,503    Sprague et al. _____ Aug. 15, 1961

FOREIGN PATENTS 202,152    Austria _____ Feb. 10, 1959